United States Patent
Wu et al.

(10) Patent No.: US 12,026,106 B2
(45) Date of Patent: Jul. 2, 2024

(54) DYNAMIC COMPRESSION FOR MULTIPROCESSOR PLATFORMS AND INTERCONNECTS

(71) Applicant: INTEL CORPORATION, Santa Clara, CA (US)

(72) Inventors: Keqiang Wu, Palatine, IL (US); Zhidong Yu, Shanghai (CN); Cheng Xu, Shanghai (CN); Samuel Ortiz, Montpellier (FR); Weiting Chen, Taipei (TW)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 17/802,117

(22) PCT Filed: Mar. 30, 2020

(86) PCT No.: PCT/CN2020/081995
§ 371 (c)(1),
(2) Date: Aug. 24, 2022

(87) PCT Pub. No.: WO2021/195825
PCT Pub. Date: Oct. 7, 2021

(65) Prior Publication Data
US 2023/0085201 A1    Mar. 16, 2023

(51) Int. Cl.
*G06F 13/38*     (2006.01)
*G06F 13/16*     (2006.01)
*G06F 13/40*     (2006.01)

(52) U.S. Cl.
CPC ...... *G06F 13/1678* (2013.01); *G06F 13/1621* (2013.01); *G06F 13/4004* (2013.01)

(58) Field of Classification Search
CPC ............ G06F 13/1678; G06F 13/1621; G06F 13/4004
See application file for complete search history.

(56) References Cited

U.S. PATENT DOCUMENTS 5,384,780 A  *  1/1995  Lomp .................... H04M 11/06
                                                             375/240
6,424,993 B1     7/2002   Weber
(Continued)

FOREIGN PATENT DOCUMENTS

| | | |
|---|---|---|
| CN | 102938683 A | 2/2013 |
| CN | 106506390 A | 3/2017 |
| WO | 2018058363 A1 | 5/2018 |

OTHER PUBLICATIONS

International Search Report and Written Opinion dated Jan. 6, 2021, for Application No. PCT/CN2020/081995.
(Continued)

*Primary Examiner* — Cheng Yuan Tseng
(74) *Attorney, Agent, or Firm* — KDW Firm PLLC

(57) ABSTRACT

The present disclosure provides an interconnect for a non-uniform memory architecture platform to provide remote access where data can dynamically and adaptively be compressed and decompressed at the interconnect link. A requesting interconnect link can add a delay to before transmitting requested data onto an interconnect bus, compress the data before transmission, or packetize and compress data before transmission. Likewise, a remote interconnect link can decompress request data.

22 Claims, 9 Drawing Sheets

(56) References Cited

U.S. PATENT DOCUMENTS

| | | | |
|---|---|---|---|
| 6,559,851 B1 * | 5/2003 | Schlapp | G06T 1/60 |
| | | | 345/530 |
| 8,160,106 B2 * | 4/2012 | Valadarsky | H04L 69/04 |
| | | | 370/521 |
| 8,897,296 B2 * | 11/2014 | Furuta | H04L 69/22 |
| | | | 370/349 |
| 9,936,049 B2 * | 4/2018 | Vajravel | G06F 13/4282 |
| 2011/0314231 A1 | 12/2011 | O'Connor | |
| 2012/0079174 A1 | 3/2012 | Nellans | |
| 2019/0045031 A1 | 2/2019 | Feghali | |

OTHER PUBLICATIONS

European Search Report for EP Application No. 20928222.7, dated Nov. 27, 2023, 14 pages.

* cited by examiner (A)

(B)

DYNAMIC COMPRESSION FOR MULTIPROCESSOR PLATFORMS AND INTERCONNECTS

CROSS-REFERENCE TO RELATED APPLICATION

This application is a national phase claiming the benefit of and priority to International Patent Application No. PCT/CN2020/081995, entitled "DYNAMIC COMPRESSION FOR MULTIPROCESSOR PLATFORMS AND INTERCONNECTS" filed Mar. 30, 2020, which is hereby incorporated by reference in its entirety.

BACKGROUND

As the computational power of computing devices increases, access to data also increases. Said differently, as computational speed increases the data access rate also increases. Some modern computing systems are implemented based the non-uniform memory access (NUMA) architecture. NUMA platforms can provide increased data access rates versus UMA platforms. However, conventional NUMA architectures do not address data access needs for remotely located data.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
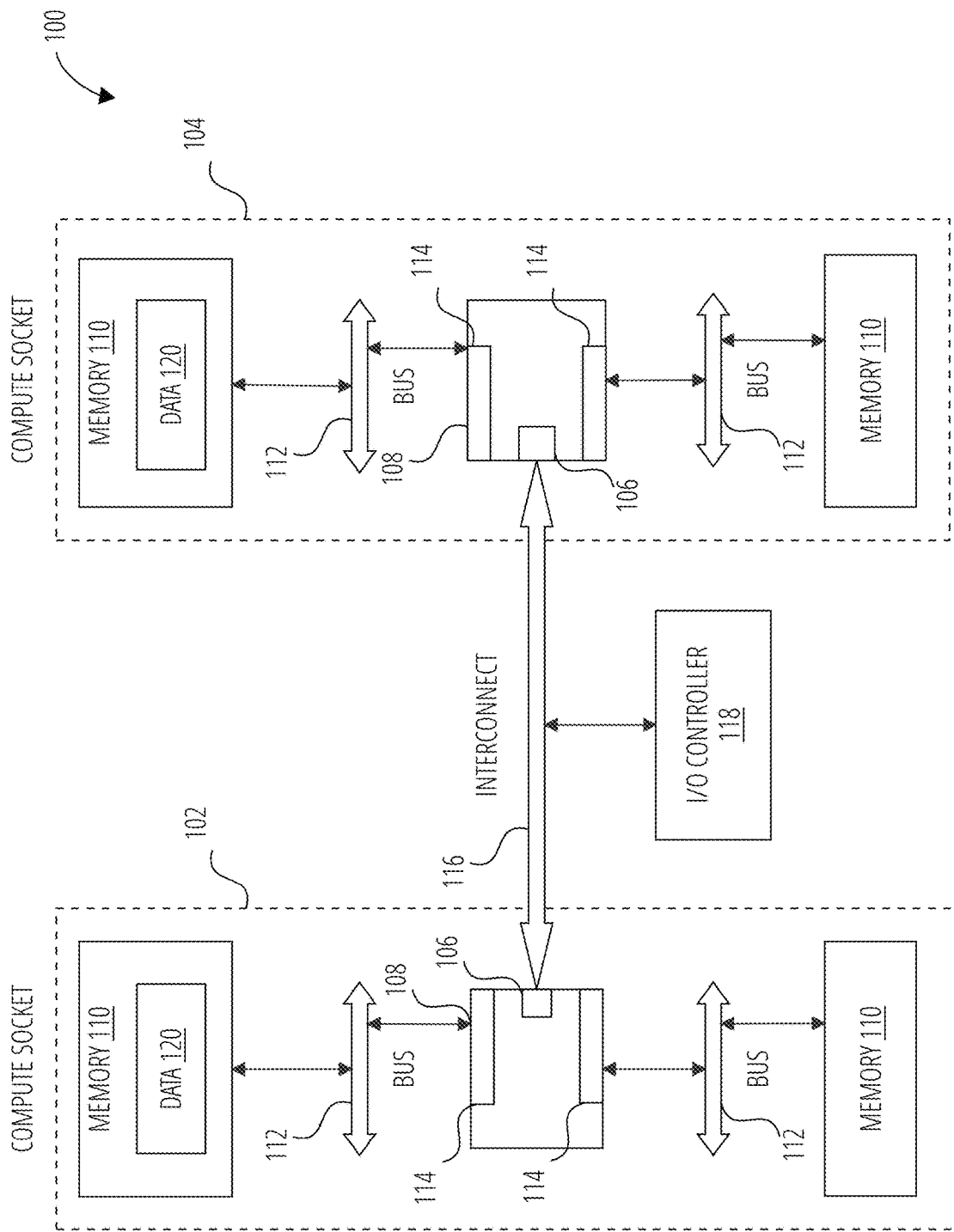
FIG. 1 is an example block diagram of a system 100 to provide adaptive compression and decompression of remote access between compute sockets.

The present disclosure provides an interconnect to optimize remote access performance in NUMA platforms. Conventionally, memory bandwidth for NUMA platforms is referenced based on local memory access. For example, NUMA memory bandwidth for a multi-processor platform with 256 GB/sec peak memory bandwidth is calculated by the following formula: (2.66 GT/s* 8 bytes per channel×N channels×M sockets). Although such a memory bandwidth might be suitable for local systems it is not suitable for other systems, such as those incorporating enterprise and/or cloud computing applications (e.g., big data analytics, content management, databases, or the like). In practice, remote memory access bandwidth for NUMA platforms is substantially less than that published by vendors and in many cases can be as little as 30% of the peak bandwidth.

Thus, the present disclosure provides an interconnect for a NUMA platform to improve data transfer efficiency by run-time profiling. With some examples, the interconnect can provide integrated compression and decompression capability into the interconnect itself. In some examples, the present disclosure provides a profile guided algorithm to control data compression and transfer. As a result, interconnects according to the present disclosure can not only dynamically maximizes interconnect data transfer efficiency but also provide flexibility to adapt to different applications or different memory access behavior patterns.

The phrases "in one embodiment", "in various embodiments", "in some embodiments", and the like are used repeatedly. Such phrases do not necessarily refer to the same embodiment. The terms "comprising", "having", and "including" are synonymous, unless the context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to or combined, without limiting the scope to the embodiments disclosed herein.

FIG. 1 is an example block diagram of a system 100 that may incorporate embodiments of the present disclosure. In general, FIG. 1 is illustrative of a computing platform comprising a NUMA architecture to carry out aspects of the technical processes described herein, and does not limit the scope of the claims. One of ordinary skill in the art would recognize other variations, modifications, and alternatives. In one embodiment, the system 100 typically includes multiple compute sockets, such as compute socket 102 and compute socket 104 coupled together via an interconnect 116.

Each compute socket (e.g., compute socket 102 and compute socket 104) includes a processor 108 coupled to memory 110 via bus 112. In particular, each processor 108 can be coupled to multiple memory 110 devices via a respective bus 112. To facilitate memory access, processor 108 can include an integrated memory controller 114. In particular, each processor 108 can include an integrated memory controller 114 for each respective bus 112 to which the processor 108 accesses memory 110.

Each processor 108 can include a multi-threaded processor or a multi-core processor (whether the multiple cores coexist on the same or separate dies). Further, each processor 108 need not be identical. In some examples, processor 108 may include graphics processing portions and may include dedicated memory, multiple-threaded processing and/or some other parallel processing capability. In some examples, the processor 108 may be an application specific integrated circuit (ASIC) or a field programmable integrated circuit (FPGA). In some implementations, the processor 108 may be circuitry arranged to perform particular computations, such as, related to artificial intelligence (AI) or graphics. Such circuitry may be referred to as an accelerator.

Memory 110 can be a tangible media configured to store computer readable data and instructions. Examples of tangible media include circuitry for storing data (e.g., semiconductor memory), such as, flash memory, non-transitory read-only-memory (ROMS), dynamic random access memory (DRAM), NAND memory, NOR memory, phase-change memory, battery-backed volatile memory, or the like. Memory 110 may often be referred to as "main memory." For example memory 110 in compute socket 102 may be referred to as main memory, or local memory, for processor 108 in compute socket 102. Likewise, memory 110 in compute socket 104 may be referred to as main memory, or local memory, for processor 108 in compute socket 104. However, memory 110 in compute socket 102 may be referred to as remote memory for processor 108 in compute socket 104. Similarly, memory 110 in compute socket 104 may be referred to as remote memory for processor 108 in compute socket 102.

Compute socket 102 and compute socket 104 may be coupled via an interconnect link 106. In general, interconnect link 106 can be any of a variety of circuits arranged to provide transmission and receipt of data via interconnect 116. For example, interconnect 116 can be a transport interconnect, such as, for example, the QuickPath Interconnect® (QPI) or the Ultra Path Interconnect® (UPI) by Intel® Corp. As another example, interconnect 116 can be the Kaizer Technology Interconnect® (KTI) by Intel® Corp. With still other examples, the interconnect 116 can be the HyperTransport® interconnect by AMD® Corp.

Although not shown, in some examples, each processor 108 can include multiple interconnect link 106 to couple to more than one compute socket. For example, FIG. 1 depicts a two socket (2S) configuration. The present disclosure can be implemented in systems with greater than two sockets, such as, for example, a four socket (4S) configuration (e.g., see FIG. 2), an eight socket (8S) configuration, or the like.

It will be readily apparent to one of ordinary skill in the art that the system 100 may be a device such as a mobile device, a desktop computer, a laptop computer, a rack-mounted computer system. Further, system 100 can be server system, such as, deployed in a data center or other enterprise environment and utilized for various workloads (e.g., cloud compute, database, content management, or the like).

Interconnect link 106 comprises circuitry to provide remote access to memory according to examples of the present disclosure. For example, interconnect link 106 can provide access to memory in another compute socket. More particularly, interconnect link 106 of processor 108 of compute socket 102 can provide access to memory 110 of compute socket 104 via interconnect 116. Further, interconnect link 106 can provide remote memory access via an input/output (I/O) device (not shown) coupled to I/O controller 118.

With some examples, the circuitry for interconnect link 106 can be incorporated into the die of processor 108. Furthermore, with some examples, the circuitry for interconnect link 106 can include circuitry arranged to communicate via interconnect 116 and to compress and decompress data communicated via the interconnect bus. In some examples, interconnect link 106 can compress and decompress data according to any of a variety of compression standards or formats (e.g., GZIP, LZ4, SNAPPY, ZSTD, or the like). With some examples, interconnect link 106 can compress and decompress data using an instruction set configured for compression techniques (e.g., advanced vector extensions, or the like).

A more detailed description of how the present disclosure provides remote memory access via interconnect 116 is described below. However, in general interconnect link 106 provide for batch and/or compression based communication via interconnect 116 based on the communication pattern or behavior of interconnect 116. Thus, it could be said that interconnect link 106 provides an adaptive compression based communication scheme for interconnect 116.

During operation, data 120 stored in memory 110 of one compute socket can be remotely accessed by another compute socket. For example, processor 108 of compute socket 102 can access data 120 stored in memory 110 of compute socket 104. Specifically, interconnect link 106 in compute socket 102 can request data 120 from interconnect link 106 of compute socket 104. Interconnect link 106 of compute socket 102 and interconnect link 106 of compute socket 104 can communicate the data via interconnect 116 using the adaptive compression techniques described herein. Processor 108 of compute socket 102 when accessing the data 120 of memory 110 in compute socket 104 remotely may store the data 120 to memory 110 (shown) or to a memory location not shown (e.g., cache of processor 108, or the like).

Figure 2:
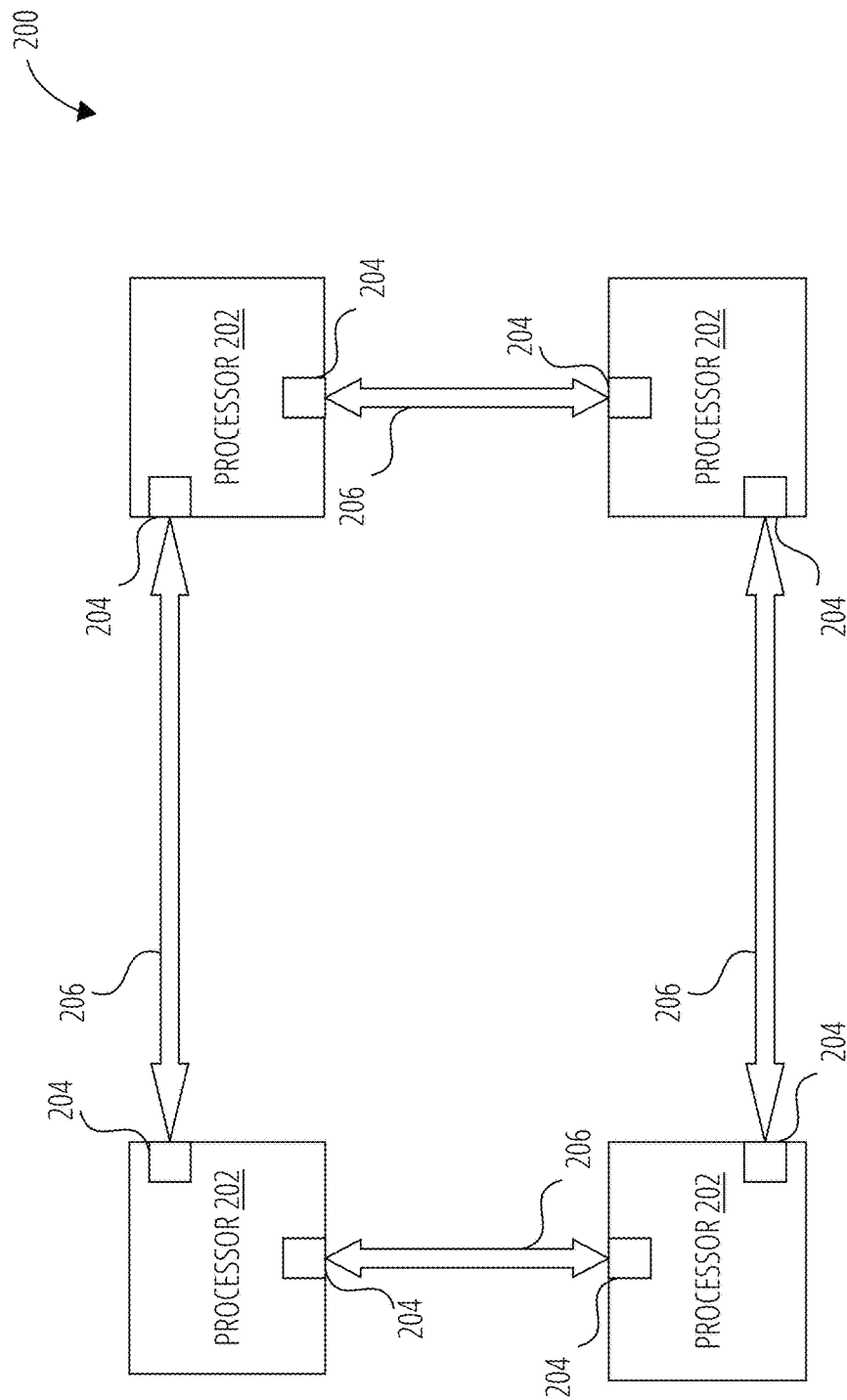
FIG. 2 is an example block diagram of a system 200 to provide adaptive compression and decompression of remote access between compute sockets.

FIG. 2 is an example block diagram of a system 200 that may incorporate embodiments of the present disclosure. In general, FIG. 2 is illustrative of a computing platform like system 100. However, system 200 includes four separate sockets arranged in a 4S architecture.

System 200 includes a four processors 202 each including a number of interconnect links 204. Interconnect links 204 provide for communicative coupling of individuals ones of processors 202 to other ones of processors 202 via interconnects 206. Processors 202 can be like processor 108 described above. Likewise, interconnect links 204 can be like interconnect link 106 and interconnects 206 can be like interconnect 116 described above.

It is noted that FIG. 2 depicts system 200 showing the NUMA architecture in a ring configuration. However, the present disclosure could be implemented by processors (e.g., processor 108, processors 202, or the like) arranged in a crossbar configuration, an 8S configuration, or the like. Examples are not limited in this context. More specifically, each processor 202 of system 200 includes two (2) interconnect links 204. However, processors could be provided with three (3) or more interconnect links 204 to facilitate more advanced or complex NUMA architecture configurations (e.g., crossbar, or the like). Examples are not limited in this context.

Figure 3:
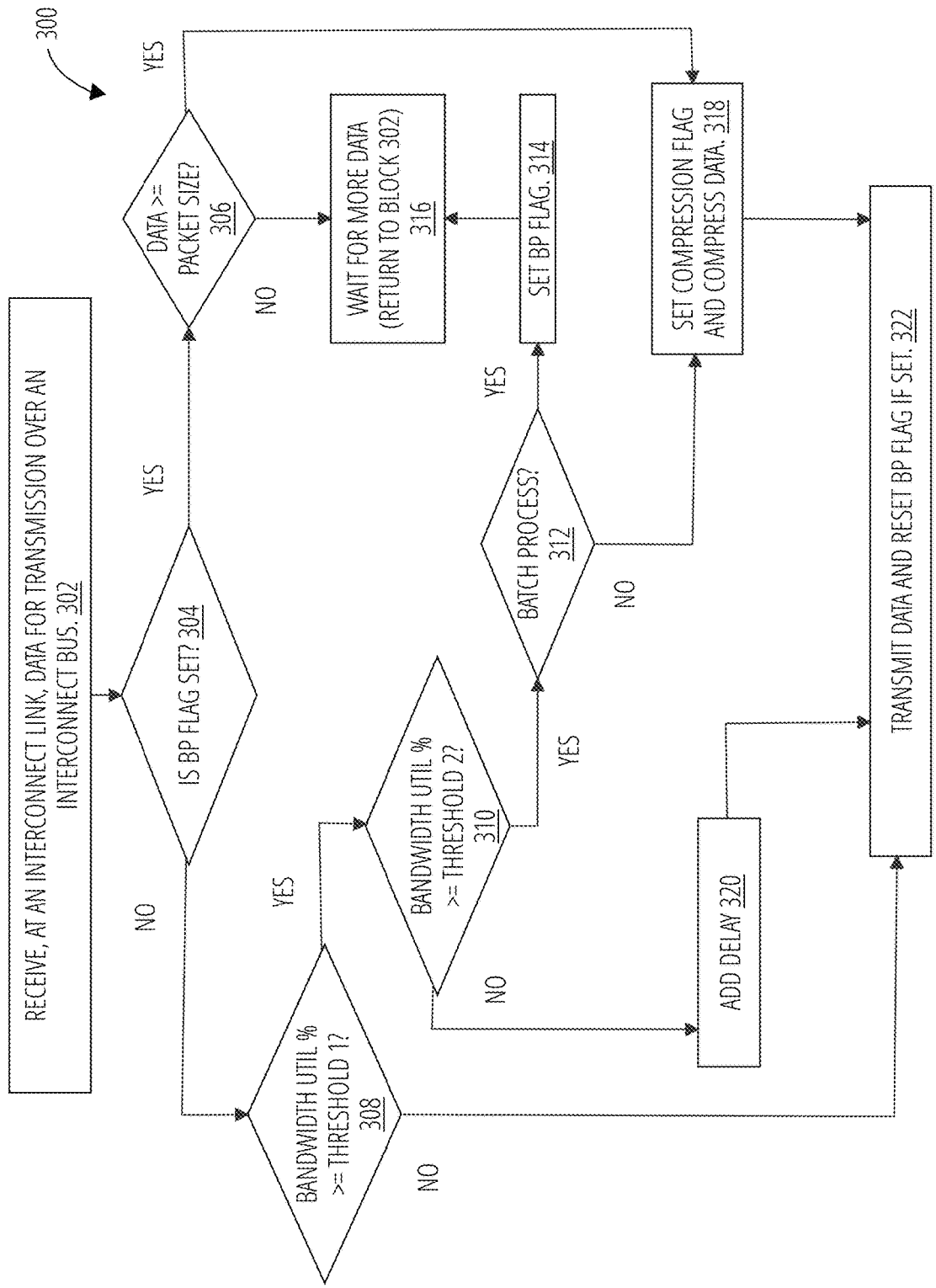
FIG. 3 illustrates a routine 300.

FIG. 3 illustrates a routine 300 that can be implemented by interconnect circuitry (e.g., interconnect link 106, interconnect links 204, or the like). In general, interconnect circuitry can implement routine 300 to provide an adaptive compression scheme for communication of data over an interconnect bus (e.g., interconnect 116, interconnects 206, or the like). In particular, interconnect circuitry (e.g., interconnect link 106, interconnect links 204, or the like) sending data over the interconnect bus (e.g., interconnect 116, interconnects 206, or the like) can implement routine 300. Although routine 300 can be implemented by any number of platform systems (e.g., system 100, system 200, or the like), routine 300 is described with reference to system 100 for convenience. Examples are not limited in this respect.

Further, for purposes of clarity, the compute socket sending data is referred to as the home socket or the remote socket while the compute socket receiving the data is referred to as the requesting socket.

Routine 300 can begin at block 302 "receive, at an interconnect link, data for transmission over an interconnect bus" where data for transmission over an interconnect bus (to a requesting socket) can be received at interconnect link (at the remote socket). For example, interconnect link 106 can receive data 120 for transmission over interconnect 116. As a specific example, interconnect link 106 of processor 108 of compute socket 102 can receive data 120 from memory 110 for transmission to interconnect link 106 of processor 108 of compute socket 104 via interconnect 116.

At decision block 304 "is batch processing (BP) flag set?" it is determined whether a batch processing flag is set. For example, an interconnect link 106 of the remote socket can determine whether a batch processing flag is set. In some examples, the batch processing flag can be a hardware register setting, a software register setting, or another type of flag usable in computing applications. From decision block 304, routine 300 can proceed to either decision block 306 or decision block 308. In particular, routine 300 can proceed from decision block 304 to decision block 308 based on a determination that the batch processing flag is not set while routine 300 can proceed from decision block 304 to decision block 306 based on a determination that the batch processing flag is set.

At decision block 308 "bandwidth utilization percentage (%) greater than or equal ($\geq$) to a first threshold value?" it is determined whether the bandwidth utilization (e.g., in percent, or the like) of the interconnect bus is greater than or equal to a first threshold value. For example, interconnect link 106 can determine whether the bandwidth utilization of interconnect 116 is greater than or equal to (or merely greater than, or the like) a first threshold utilization value. In some examples, the first threshold utilization value can be 70% utilization, 60% utilization, or 50% utilization.

From decision block 308, routine 300 can proceed to either decision block 310 or block 322. In particular, routine 300 can proceed from decision block 308 to decision block 310 based on a determination the bandwidth utilization of the interconnect bus is greater than or equal to the first threshold value while routine 300 can proceed from decision block 308 to block 322 based on a determination that the bandwidth utilization of the interconnect bus is not greater than or equal to the first threshold value.

With some examples, interconnect link 106 can determine a utilization of interconnect 116 based on a number of runtime monitoring techniques, such as, for example, profiler circuitry or profiler software. As a specific example, interconnect link 106 can implement profiling like VTune, Oprofile, Perf Collect, or the like.

At decision block 310 "bandwidth utilization percentage (%) greater than or equal ($\geq$) to a second threshold value?" it is determined whether the bandwidth utilization (e.g., in percent, or the like) of the interconnect bus is greater than or equal to a second threshold value. For example, interconnect link 106 can determine whether the bandwidth utilization of interconnect 116 is greater than or equal to (or merely greater than, or the like) a second threshold utilization value. In some examples, the second threshold value will be higher than the first threshold value. For example, the second threshold value can be 60%, 65%, 70%, 75%, 80%, 85%, 90%, or the like.

From decision block 310, routine 300 can proceed to either decision block 312 or block 320. In particular, routine 300 can proceed from decision block 310 to decision block 312 based on a determination the bandwidth utilization of the interconnect bus is greater than or equal to the second threshold value while routine 300 can proceed from decision block 310 to block 320 based on a determination that the bandwidth utilization of the interconnect bus is not greater than or equal to the second threshold value.

At decision block 312 "batch process?" it is determined whether to batch process the data. For example, interconnect link 106 can determine whether batch processing of data communicated over interconnect 116 is allowed and/or desired. In some examples, whether to batch process can be determined based of a register value. With other examples, whether to batch process can be determined based of a third (higher than the second) threshold value. As a specific example, interconnect link 106 can determine to batch process if the utilization of interconnect 116 is a threshold value (e.g., 5%, 10%, or the like) higher than the second threshold value. In some examples, the threshold values, the compression scheme, whether to batch process, or the like can be specified in a five (5) layer model (e.g., physical layer, link layer, routing layer, transport layer, protocol layer, or the like).

From decision block 312, routine 300 can proceed to either block 314 or block 318. In particular, routine 300 can proceed from decision block 310 to block 314 based on a determination to batch process the data while routine 300 can proceed from decision block 312 to block 318 based on a determination to not batch process the data.

At block 314 "set batch processing (BP) flag" the batch processing flag can be set. For example, interconnect link 106 can set the batch processing flag. At block 316 "wait for more data (return to block 302)" routine 300 can wait for more data and return to block 302 responsive to receiving more data to transmit via interconnect 116.

At decision block 306 "data$\geq$packet size" it is determined whether the amount or quantity (e.g., bits, bytes, packets, or the like) of received data is greater than or equal ($\geq$) to a batch processing packet size. In general, the batch processing packet size can be any number of data packets. However, generally, the number of packets for batch processing can be determined based on maximizing the compression ratio and/or minimizing the packet header overhead. With some examples, the number of packet for batch processing can be specified in a 5 layer model and may be determined in advance (e.g., via sensitivity experiments, or the like).

From decision block 306, routine 300 can proceed to either block 316 or block 318. In particular, routine 300 can proceed from decision block 306 to block 316 based on that the data received is not greater than or equal to the packet size while routine 300 can proceed from decision block 306 to block 318 based on a determination that the data to data received is greater than or equal to the packet size.

At block 318 "set compression flag and compress data" the data is compressed and a compression flag is set. For example, interconnect link 106 can compress data 120 received and can set a compression flag (e.g., hardware register, software flag, indication in the 5 layer model, or the like). With some examples, where batch processing is occurring, the received data can be combined (e.g., bitwise and, or the like) prior to compressing. Further, at block 318 interconnect link 106 can compress the data 120 (or the batch of data 120).

At block 320 "add delay" a delay can be added before proceeding to transmit the data at block 322. For example, interconnect link 106 can delay prior to transmitting data 120 via interconnect 116. With some examples the delay can be randomly selected from a range of values. For example, the delay can be between 1 and 200 nanoseconds. With some examples, interconnect link 106 can add a delay based on the utilization percentage of interconnect 116. As a specific example, the delay may be a function of the bandwidth utilization of interconnect 116 and a random seed.

At block 322 "transmit the data and reset the batch processing (BP) flag" the interconnect link can transmit the data via the interconnect bus and can reset the batch processing flag. For example, interconnect link 106 can transmit data 120 (e.g., compressed, uncompressed, or the like) via interconnect 116 and can reset the batch processing flag. In particular, interconnect link 106 from one compute socket can transmit the data to another interconnect link 106 of another compute socket.

Figure 4:
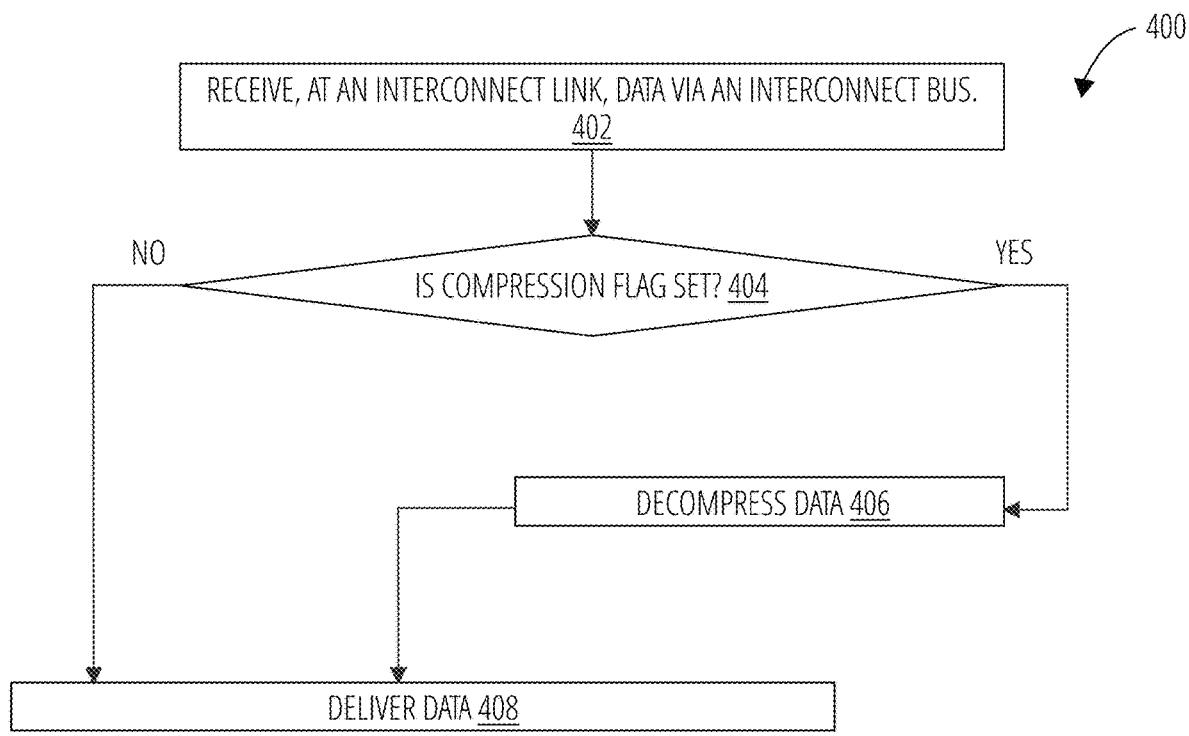
FIG. 4 illustrates a routine 400.

FIG. 4 illustrates a routine 400 that can be implemented by interconnect circuitry (e.g., interconnect link 106, interconnect links 204, or the like). In general, interconnect circuitry can implement routine 400 to provide an adaptive decompression scheme for communication of data over an interconnect bus (e.g., interconnect 116, interconnects 206, or the like). In particular, interconnect circuitry (e.g., interconnect link 106, interconnect links 204, or the like) receiving data over the interconnect bus (e.g., interconnect 116, interconnects 206, or the like) can implement routine 400. Although routine 400 can be implemented by any number of platform systems (e.g., system 100, system 200, or the like), routine 400 is described with reference to system 100 for convenience. Examples are not limited in this respect.

Routine 400 can begin at block 402 "receive, at an interconnect link, data via an interconnect bus" where data can be received (e.g., from a remote socket) at an at interconnect link (at a requesting socket) via an interconnect bus. For example, interconnect link 106 can receive data 120 transmitted via interconnect 116. As a specific example, interconnect link 106 of processor 108 of compute socket 104 can receive data 120 transmitted by interconnect link 106 of processor 108 of compute socket 102 via interconnect 116.

At decision block 404 "is compression flag set?" it is determined whether a compression flag is set. For example, an interconnect link 106 of the requesting socket can determine whether a compression flag is set. In some examples, the compression flag can be a hardware register setting, a software register setting, a setting in the 5-layer model, or another type of flag usable in computing applications. From decision block 404, routine 400 can proceed to either block 406 or block 408. In particular, routine 400 can proceed from decision block 404 to block 406 based on a determination that the compression flag is set while routine 400 can proceed from decision block 404 to block 408 based on a determination that the compression flag is not set.

At block 406 "decompress data" the interconnect link can decompress the received data. For example interconnect link 106 can decompress the data received via interconnect 116. At block 408 "deliver data" the interconnect link can deliver the data. For example, interconnect link 106 can save the data to memory 110 of the requesting socket. As another example, interconnect link 106 can deliver the data to a cache of processor 108. As another example, interconnect link 106 can provide the data directly to a core of processor 108.

Figure 5:
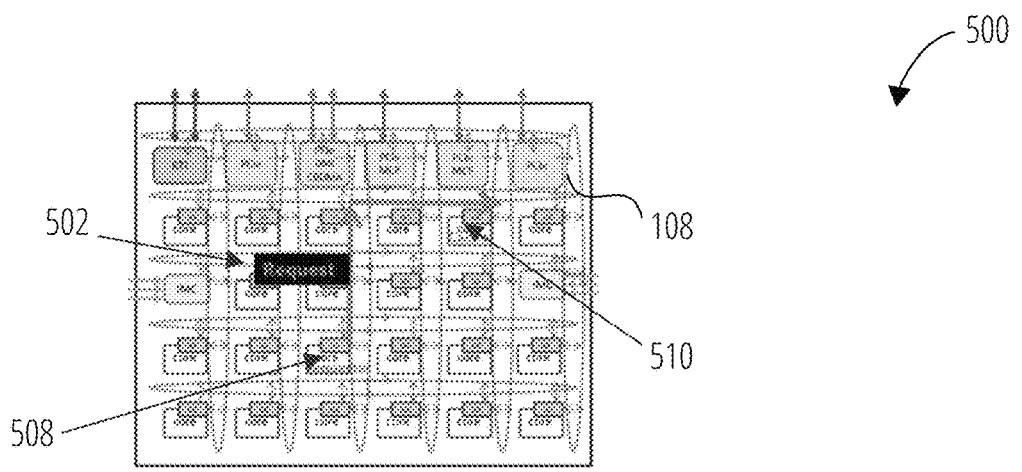
FIG. 5(A) to FIG. 5(C) illustrate a technique 500.
Figure 5:
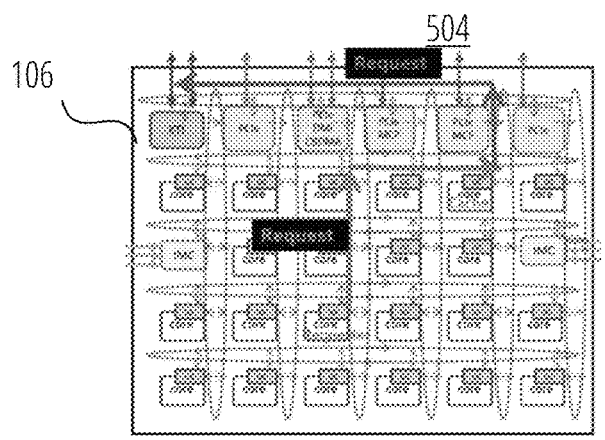
Figure 5:
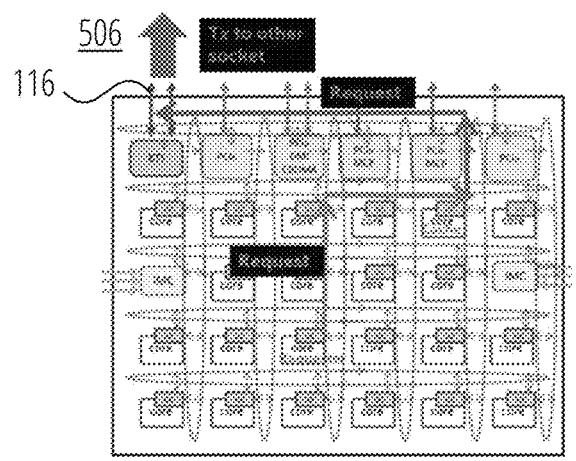

FIG. 5(A) to FIG. 5(C) illustrate a technique 500 that can be implemented at a requesting compute socket to provide remote access to data at a remote compute socket. For example, compute socket 102, as a requesting socket, could implement technique 500. It is noted that technique 500 can be implemented by any number of platform systems (e.g., system 100, system 200, or the like), however, technique 500 is described with reference to system 100 for convenience. Examples are not limited in this respect. These figures show processor 108, and components of processor 108 (e.g., interconnect link 106, memory controller 114, processor cores, processor cache, and the like). It is noted that technique 500 could be implemented by another processor or system-on-chip (SoC) different than that depicted (e.g., a processor 108 having a HyperTransport® link, a QPI link, a UPI link, or the like).

In general, technique 500 details sending a request for remote data from a requesting socket to a remote socket. As shown in FIG. 5(A), technique 500 can include block 502. At block 502 a core 508 of processor 108 can request data 120 from cache 510. Cache 510 can determine (e.g., based on a NUMA architecture, or the like) that data 120 is remotely located (e.g., located in a different compute socket, or the like). Responsive to the determination that the data 120 requested by core 508 is remote, cache 510 can forward the request to interconnect link 106. For example, at show in block 504 of FIG. 5(A), interconnect link 106 can receive a request for access to data 120.

FIG. 5(C) illustrates technique 500 and block 506 where interconnect link 106 transmits the request to an interconnect link of a remote socket via interconnect 116.

FIG. 6(A) to FIG. 6(F) illustrate a technique 600 that can be implemented at a remote compute socket to provide remote access to data for a requesting compute socket. For example, compute socket 102, as a remote socket, could implement technique 600. It is noted that technique 600 can be implemented by any number of platform systems (e.g., system 100, system 200, or the like), however, technique 600 is described with reference to system 100 for convenience. Examples are not limited in this respect. These figures show processor 108, and components of processor 108 (e.g., interconnect link 106, memory controller 114, processor cores, processor cache, and the like). It is noted that technique 600 could be implemented by another processor or system-on-chip (SoC) different than that depicted (e.g., a processor 108 having a HyperTransport® link, a QPI link, a UPI link, or the like).

Figure 6:
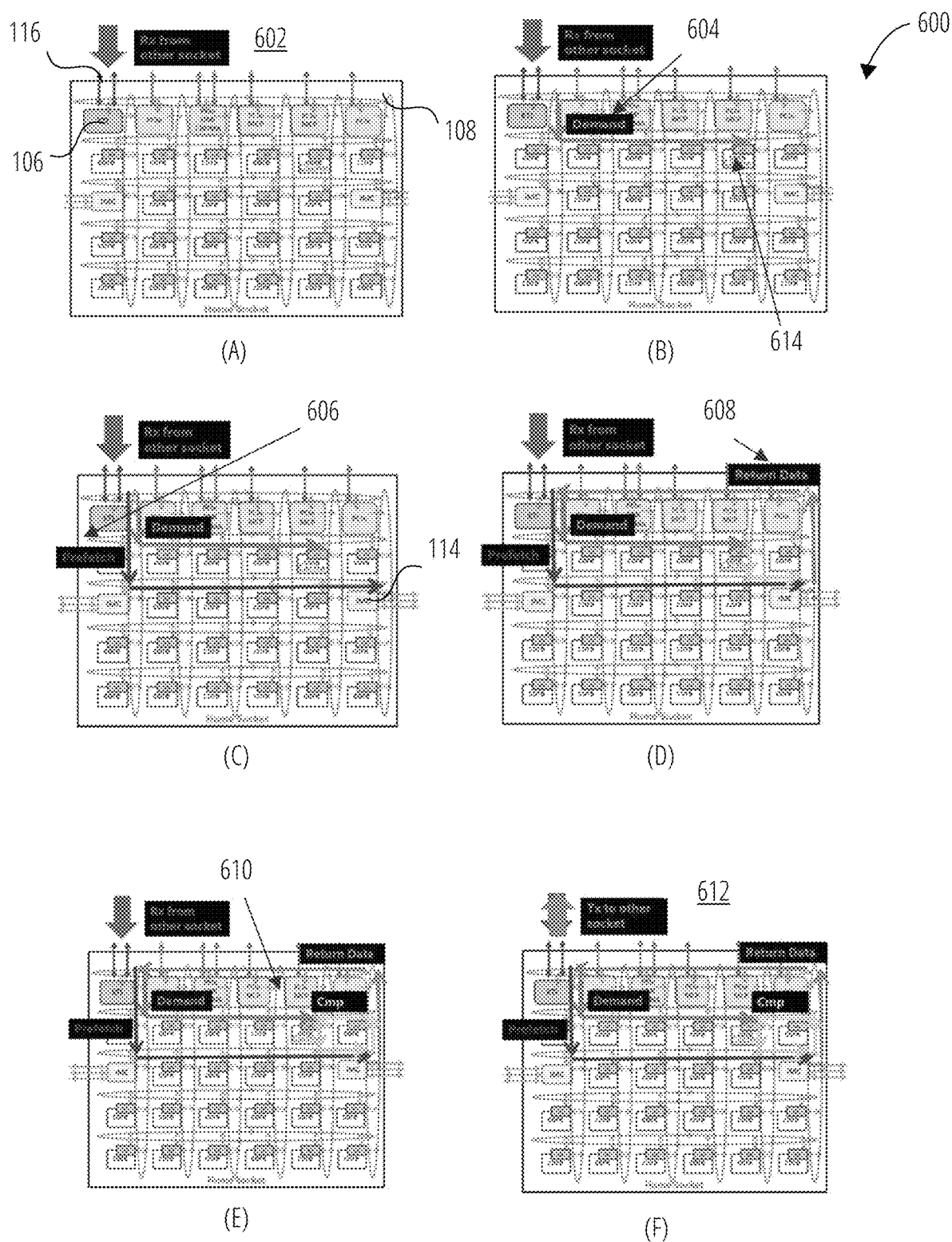
FIG. 6(A) to FIG. 6(F) illustrate a technique 600.

As shown in FIG. 6(A), technique 600 can include block 602. At block 602 interconnect link 106 of processor 108 can receive a remote data access request from a requesting socket. As shown in FIG. 6(B) and block 604, interconnect link 106 can demand data 120 from cache 614 of processor 108. As indicated by FIG. 6(C), interconnect link 106 can prefetch data 120 from memory 110 (now shown) via memory controller 114 at block 606.

FIG. 6(D) illustrates technique 600 and block 608 where interconnect link 106 can receive the demanded data 120. In some examples, data 120 can be returned to interconnect link 106 via memory controller 114 and cache 614. Turning to FIG. 6(E), at block 610 of technique 600, interconnect link 106 can compress data 120. In particular, at block 610, interconnect link 106 can implement routine 300 to determine whether to add a delay before transmission of data 120, compress data 120, or packetize and compress data 120. With some examples, compression of data 120 can be facilitated by circuitry of interconnect link 106 and cache 614.

FIG. 6(F) shows block 612 of technique 600 where interconnect link 106 transmits the data 120 (e.g., uncompressed, compressed, or packetized and compressed) to the requesting socket.

Figure 7:
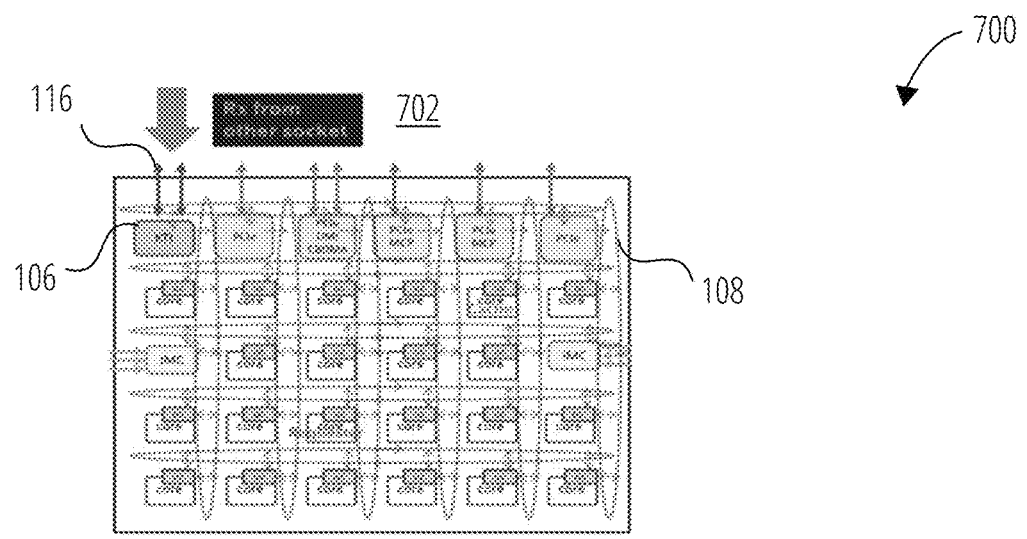
FIG. 7(A) to FIG. 7(B) illustrate a technique 700.
Figure 7:
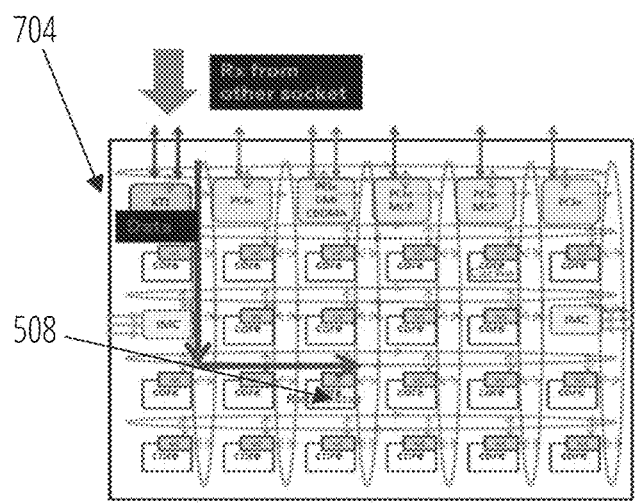

FIG. 7(A) and FIG. 7(B) illustrate a technique 700 that can be implemented at a requesting compute socket to provide remote access to data at a remote compute socket. For example, compute socket 102, as a requesting socket, could implement technique 700. It is noted that technique 700 can be implemented by any number of platform systems (e.g., system 100, system 200, or the like), however, technique 700 is described with reference to system 100 for convenience. Examples are not limited in this respect. These figures show processor 108, and components of processor 108 (e.g., interconnect link 106, memory controller 114, processor cores, processor cache, and the like). It is noted that technique 700 could be implemented by another processor or system-on-chip (SoC) different than that depicted (e.g., a processor 108 having a HyperTransport® link, a QPI link, a UPI link, or the like).

In general, technique 700 details receiving remote data from a remote socket. As shown in FIG. 7(A), technique 700 can include block 702. At block 702 an interconnect link 106 of processor 108 can receive data 120 via interconnect 116. For example, interconnect link 106 can receive, via interconnect 116, data 120 requested by core 508 at block 502 detailed in FIG. 5(A).

As shown in FIG. 7(B), technique 700 can include block 704 where interconnect link 106 can provide the data 120 directly to the requesting core 508. In some examples, such as, where data 120 is compressed, interconnect link 106 can also decompress the data.

Figure 8:
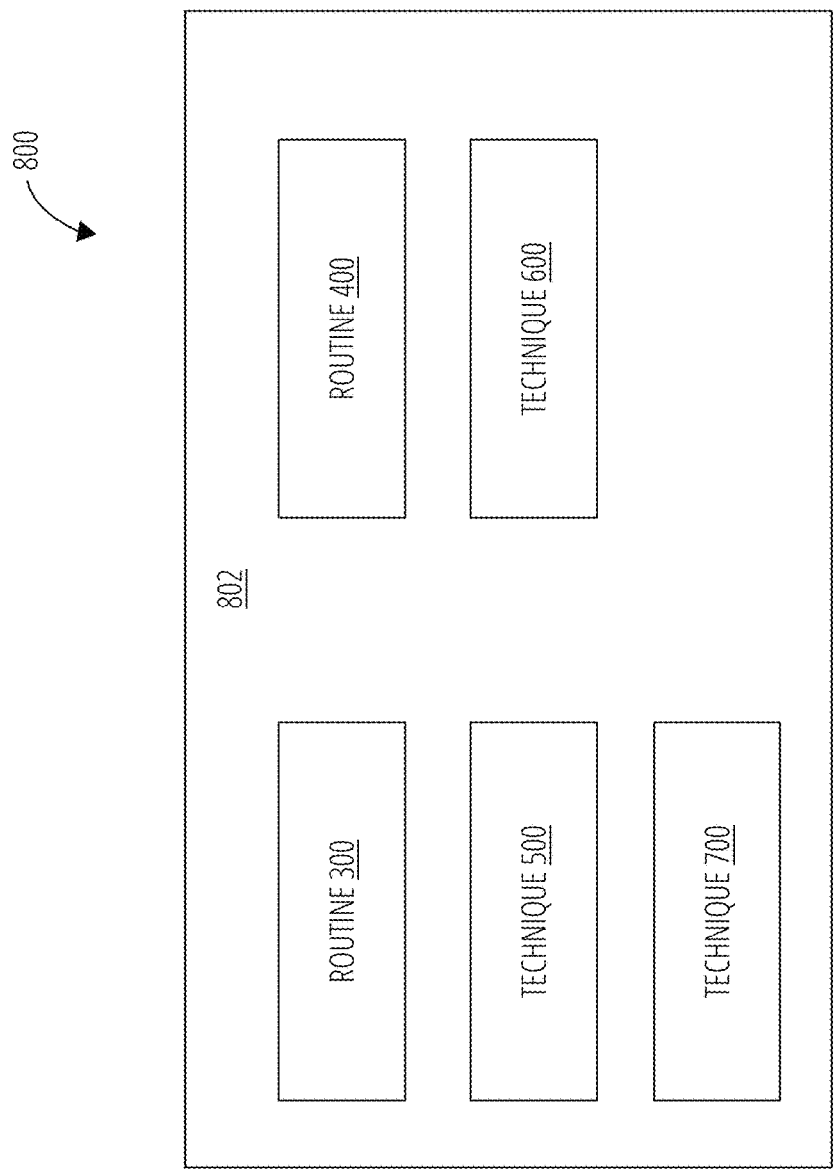
FIG. 8 illustrates a computer-readable storage medium 800.

FIG. 8 illustrates computer-readable storage medium 800. Computer-readable storage medium 800 may comprise any non-transitory computer-readable storage medium or machine-readable storage medium, such as an optical, magnetic or semiconductor storage medium. In various embodiments, computer-readable storage medium 800 may comprise an article of manufacture. In some embodiments, 700 may store computer executable instructions 802 with which circuitry (e.g., processor 108, or the like) can execute. For example, computer executable instructions 802 can include instructions to implement operations described with respect to routine 300, routine 400, technique 500, technique 600, and/or technique 700. Examples of computer-readable storage medium 800 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 802 may include any suitable type of code, such as source code, compiled code, interpreted code, executable code, static code, dynamic code, object-oriented code, visual code, and the like.

Figure 9:
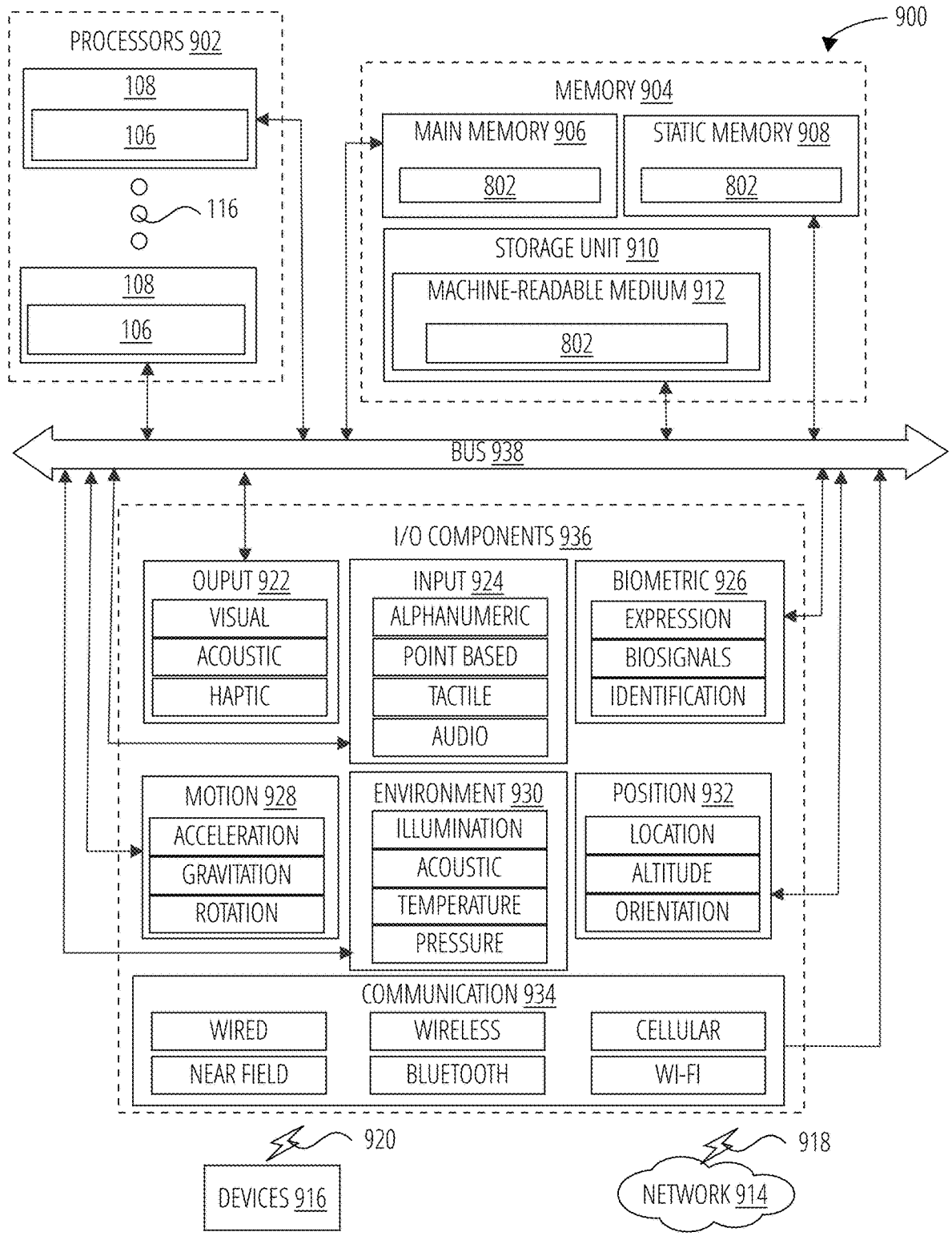
FIG. 9 illustrates a diagrammatic representation of a machine 900 in the form of a computer system including multiple compute sockets.

FIG. 9 illustrates a diagrammatic representation of a machine 900 in the form of a computer system within which a set of instructions may be executed for causing the machine to perform any one or more of the methodologies discussed herein. More specifically, FIG. 9 shows a diagrammatic representation of the machine 900 in the example form of a computer system, within which computer executable instructions 802 (e.g., software, a program, an application, an applet, an app, or other executable code) for causing the machine 900 to perform any one or more of the methodologies discussed herein may be executed. For example the computer executable instructions 802 may cause the machine 900 to execute routine 300 of FIG. 3, routine 400 of FIG. 4, technique 500 of FIG. 5(A) to FIG. 5(C), technique 600 of FIG. 6(A) to FIG. 6(F), or technique 700 of FIG. 7(A) to FIG. 7(B), or the like. More generally, the computer executable instructions 802 may cause the machine 900 to provide remote access to data of compute sockets as detailed herein.

The computer executable instructions 802 transform the general, non-programmed machine 900 into a particular machine 900 programmed to carry out the described and illustrated functions in a specific manner. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the computer executable instructions 802, sequentially or otherwise, that specify actions to be taken by the machine 900. Further, while only a single machine 900 is illustrated, the term "machine" shall also be taken to include a collection of machines 200 that individually or jointly execute the computer executable instructions 802 to perform any one or more of the methodologies discussed herein.

The machine 900 may include processors 902, memory 904, and I/O components 936, which may be configured to communicate with each other such as via a bus 938. In an example embodiment, the processors 902 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a first processor 108 and a second processor 108 each including interconnect link 106. The first processor 108 and the second processor 108 may be coupled via interconnect 116.

The memory 904 may include a main memory 906, a static memory 908, and a storage unit 910, both accessible to the processors 902 such as via the bus 938. The main memory 904, the static memory 908, and storage unit 910 store the computer executable instructions 802 embodying any one or more of the methodologies or functions described herein. The computer executable instructions 802 may also reside, completely or partially, within the main memory 906, within the static memory 908, within machine-readable medium 912 within the storage unit 910, within at least one of the processors 902 (e.g., within the processor's cache memory), or any suitable combination thereof, during execution thereof by the machine 900.

The I/O components 936 may include a wide variety of components to receive input, provide output, produce output, transmit information, exchange information, capture measurements, and so on. The specific I/O components 936 that are included in a particular machine will depend on the type of machine. For example, portable machines such as mobile phones will likely include a touch input device or other such input mechanisms, while a headless server machine will likely not include such a touch input device. It will be appreciated that the I/O components 936 may include many other components that are not shown in FIG. 9. The I/O components 936 are grouped according to functionality merely for simplifying the following discussion and the grouping is in no way limiting. In various example embodiments, the I/O components 936 may include output components 922 and input components 924. The output components 922 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 924 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 936 may include biometric components 926, motion components 928, environmental components 930, or position components 932, among a wide array of other components. For example, the biometric components 926 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 928 may include acceleration sensor components (e.g., accelerometer), gravitation sensor components, rotation sensor components (e.g., gyroscope), and so forth. The environmental components 930 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 932 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 936 may include communication components 934 operable to couple the machine 900 to a network 914 or devices 916 via a coupling 918 and a coupling 920, respectively. For example, the communication components 934 may include a network interface component or another suitable device to interface with the network 914. In further examples, the communication components 934 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 916 may be another machine or any of a wide variety of peripheral devices (e.g., a peripheral device coupled via a USB).

Moreover, the communication components 934 may detect identifiers or include components operable to detect identifiers. For example, the communication components 934 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 934, such as location via Internet Protocol (IP) geolocation, location via Wi-Fi® signal triangulation, location via detecting an NFC beacon signal that may indicate a particular location, and so forth.

The various memories (i.e., memory 904, main memory 906, static memory 908, and/or memory of the processors 902) and/or storage unit 910 may store one or more sets of instructions and data structures (e.g., software) embodying or utilized by any one or more of the methodologies or functions described herein. These instructions (e.g., the computer executable instructions 802), when executed by processors 902, cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 914 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 914 or a portion of the network 914 may include a wireless or cellular network, and the coupling 918 may be a Code Division Multiple Access (CDMA) connection, a Global System for Mobile communications (GSM) connection, or another type of cellular or wireless coupling. In this example, the coupling 918 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The computer executable instructions 802 may be transmitted or received over the network 914 using a transmission medium via a network interface device (e.g., a network interface component included in the communication components 934) and utilizing any one of a number of well-known transfer protocols (e.g., hypertext transfer protocol (HTTP)). Similarly, the computer executable instructions 802 may be transmitted or received using a transmission medium via the coupling 920 (e.g., a peer-to-peer coupling) to the devices 916. The terms "transmission medium" and "signal medium" mean the same thing and may be used interchangeably in this disclosure. The terms "transmission medium" and "signal medium" shall be taken to include any intangible medium that is capable of storing, encoding, or carrying the computer executable instructions 802 for execution by the machine 900, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Terms used herein should be accorded their ordinary meaning in the relevant arts, or the meaning indicated by their use in context, but if an express definition is provided, that meaning controls.

Herein, references to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other. Any terms not expressly defined herein have their conventional meaning as commonly understood by those having skill in the relevant art(s).

The following examples pertain to further embodiments, from which numerous permutations and configurations will be apparent.

Example 1. A computing apparatus, comprising: a processing unit comprising: at least one processing core; and interconnect link circuitry to couple to an interconnect bus, the interconnect link circuitry to: receive data to be transmitted via the interconnect bus; determine whether a bandwidth utilization of the interconnect bus is greater than or equal to a first threshold value; determine whether a bandwidth utilization of the interconnect bus is greater than or equal to a second threshold value, the second threshold value greater than the first threshold value; and transmit the data to a requesting interconnect link via the interconnect bus based on determination that the bandwidth utilization of the interconnect bus is not greater than or equal to the first threshold value; transmit, after a delay, the data to a requesting interconnect link via the interconnect bus based on determination that the bandwidth utilization of the interconnect bus is greater than or equal to the first threshold value and a determination that the bandwidth utilization of the interconnect bus is not greater than or equal to the second threshold value; or compress the data and transmitting the compressed data to a requesting interconnect link via the interconnect bus based on determination that the bandwidth utilization of the interconnect bus is greater than or equal to the second threshold value.

Example 2. The computing apparatus of example 1, the interconnect link circuitry to: receive, at the interconnect link, second data to be transmitted via the interconnect bus; determine whether a batch processing flag is set; compress the data and the second data based on a determination that the batch processing flag is set; and transmit the compressed data and the second data to the requesting interconnect link via the interconnect bus.

Example 3. The computing apparatus of example 2, the interconnect link circuitry to combine the data and the second data based in part on a bitwise addition operation.

Example 4. The computing apparatus of example 1, the interconnect link circuitry to set a compression flag based on a determination that the bandwidth utilization of the interconnect bus is greater than or equal to the second threshold value.

Example 5. The computing apparatus of example 1, the interconnect link circuitry to: determine, responsive to a determination that the bandwidth utilization of the interconnect bus is greater than or equal to the second threshold value, whether to batch process data transmission; set a batch process flag based on a determination to batch process data transmission; and wait for additional data to transmit via the interconnect bus.

Example 6. The computing apparatus of example 1, wherein the first threshold value is one of 50%, 55%, 60%, 65%, 70%, or a value between 50% and 70%.

Example 7. The computing apparatus of example 1, wherein the second threshold value is one of 60%, 65%, 70%, 75%, 80%, 85%, or a value between 60% and 85%.

Example 8. A processing unit, comprising: at least one processing core; and interconnect link circuitry to couple to an interconnect bus, the interconnect link circuitry to: receive at an interconnect link data transmitted via an interconnect bus coupled to the interconnect link; determine whether a compression flag is set bandwidth utilization of the interconnect bus is greater than or equal to a first threshold value; decompress the data based on a determination that the compression flag is set; and deliver the data or the decompressed data to a core of a processing unit.

Example 9. The processing unit of example 8, wherein the processing unit is in a first compute socket of a non-uniform memory architecture system.

Example 10. The processing unit of example 8, wherein the compression flag is set in a layer of a five layer model.

Example 11. A computer-implemented method, comprising: receiving, at an interconnect link, data to be transmitted via an interconnect bus coupled to the interconnect link; determining whether a bandwidth utilization of the interconnect bus is greater than or equal to a first threshold value; determining whether a bandwidth utilization of the interconnect bus is greater than or equal to a second threshold value, the second threshold value greater than the first threshold value; and transmitting the data to a requesting interconnect link via the interconnect bus based on determination that the bandwidth utilization of the interconnect bus is not greater than or equal to the first threshold value; transmitting, after a delay, the data to a requesting interconnect link via the interconnect bus based on determination that the bandwidth utilization of the interconnect bus is greater than or equal to the first threshold value and a determination that the bandwidth utilization of the interconnect bus is not greater than or equal to the second threshold value; or compressing the data and transmitting the compressed data to a requesting interconnect link via the interconnect bus based on determination that the bandwidth utilization of the interconnect bus is greater than or equal to the second threshold value.

Example 12. The computer-implemented method of example 11, comprising: receiving, at the interconnect link, second data to be transmitted via the interconnect bus; determining whether a batch processing flag is set; compressing the data and the second data based on a determination that the batch processing flag is set; and transmitting the compressed data and the second data to the requesting interconnect link via the interconnect bus.

Example 13. The computer-implemented method of example 12, comprising combining the data and the second data based in part on a bitwise addition operation.

Example 14. The computer-implemented method of example 11, comprising setting a compression flag based on a determination that the bandwidth utilization of the interconnect bus is greater than or equal to the second threshold value.

Example 15. The computer-implemented method of example 11, comprising:
determining, responsive to a determination that the bandwidth utilization of the interconnect bus is greater than or equal to the second threshold value, whether to batch process data transmission; set a batch processing flag based on a determination to batch process data transmission; and wait for additional data to transmit via the interconnect bus.

Example 16. The computer-implemented method of example 11, wherein the first threshold value is one of 50%, 55%, 60%, 65%, 70%, or a value between 50% and 70%.

Example 17. The computer-implemented method of example 11, wherein the second threshold value is one of 60%, 65%, 70%, 75%, 80%, 85%, or a value between 60% and 85%.

Example 18. The computer-implemented method of example 11, the interconnect link circuitry of a processing unit comprising a plurality of processing cores.

Example 19. A computer-implemented method, comprising: receiving at an interconnect link data transmitted via an interconnect bus coupled to the interconnect link; determining whether a compression flag is set bandwidth utilization of the interconnect bus is greater than or equal to a first threshold value; decompressing the data based on a determination that the compression flag is set; and delivering the data or the decompressed data to a core of a processing unit.

Example 20. The computer-implemented method of example 19, wherein the interconnect link is circuitry of the processing unit.

Example 21. The computer-implemented method of example 19, wherein the compression flag is set in a layer of a five layer model.

Example 22. An apparatus comprising means to implement the function of any one of examples 11 to 21.

Example 23. At least one non-transitory computer-readable storage medium comprising instructions that when executed by a computing device, cause the computing device to perform the method of any one of examples 11 to 21.

Example 24. A system, comprising: a first processing unit; an interconnect bus; and a second processing unit coupled to the first processing unit via the interconnect bus, wherein the first processing unit comprises; at least one processing core; and interconnect link circuitry to couple to the interconnect bus, the interconnect link circuitry to: receive data to be transmitted to the second processing unit via the interconnect bus; determine whether a bandwidth utilization of the interconnect bus is greater than or equal to a first threshold value; determine whether a bandwidth utilization of the interconnect bus is greater than or equal to a second threshold value, the second threshold value greater than the first threshold value; and transmit the data to a requesting interconnect link of the second processing unit via the interconnect bus based on a determination that the bandwidth utilization of the interconnect bus is not greater than or equal to the first threshold value; transmit, after a delay, the data to the requesting interconnect link of the second processing unit via the interconnect bus based on a determination that the bandwidth utilization of the interconnect bus is greater than or equal to the first threshold value and a determination that the bandwidth utilization of the interconnect bus is not greater than or equal to the second threshold value; or compress the data and transmit the compressed data to the requesting interconnect link of the second processing unit via the interconnect bus based on a determination that the bandwidth utilization of the interconnect bus is greater than or equal to the second threshold value.

Example 25. The system of claim 24, the interconnect link circuitry to: receive, at the interconnect link circuitry, second data to be transmitted via the interconnect bus; determine whether a batch processing flag is set; compress the data and the second data based on a determination that the batch processing flag is set; and transmit the compressed data and the second data to the requesting interconnect link of the second processing unit via the interconnect bus.

Example 26. The system of claim 25, the interconnect link circuitry to combine the data and the second data based in part on a bitwise addition operation.

Example 27. The system of claim 24, the interconnect link circuitry to set a compression flag based on a determination that the bandwidth utilization of the interconnect bus is greater than or equal to the second threshold value.

Example 28. The system of claim 24, the interconnect link circuitry to: determine, responsive to a determination that the bandwidth utilization of the interconnect bus is greater than or equal to the second threshold value, whether to batch process data transmission; set a batch process flag based on a determination to batch process data transmission; and wait for additional data to transmit via the interconnect bus.

Example 29. The system of claim 24, wherein the first threshold value is one of 50%, 55%, 60%, 65%, 70%, or a value between 50% and 70%.

Example 30. The system of claim 24, wherein the second threshold value is one of 60%, 65%, 70%, 75%, 80%, 85%, or a value between 60% and 85%.

Example 31. The system of claim 24, wherein the second processing unit comprises; at least one processing core; and interconnect link circuitry to couple to the interconnect bus, the interconnect link circuitry of the second processing unit to: receive, at the interconnect link circuitry of the second processing unit, data transmitted from the first processing unit via the interconnect bus; determining whether a compression flag is set; decompressing the data based on a determination that the compression flag is set; and delivering the data or the decompressed data to a one of the at least one processing core of the second processing unit.

Example 32. The system of example 31, wherein the compression flag is set in a layer of a five layer model.

What is claimed is:

1. A computing apparatus, comprising:
a processing unit comprising:
at least one processing core; and
interconnect link circuitry to couple to an interconnect bus, the interconnect link circuitry to:
receive data to be transmitted via the interconnect bus;
determine whether a bandwidth utilization of the interconnect bus is greater than or equal to a first threshold value;
determine whether a bandwidth utilization of the interconnect bus is greater than or equal to a second threshold value, the second threshold value greater than the first threshold value; and
transmit the data to a requesting interconnect link via the interconnect bus based on determination that the bandwidth utilization of the interconnect bus is not greater than or equal to the first threshold value;
transmit, after a delay, the data to a requesting interconnect link via the interconnect bus based on determination that the bandwidth utilization of the interconnect bus is greater than or equal to the first threshold value and a determination that the bandwidth utilization of the interconnect bus is not greater than or equal to the second threshold value; or
compress the data and transmitting the compressed data to a requesting interconnect link via the interconnect bus based on determination that the bandwidth utilization of the interconnect bus is greater than or equal to the second threshold value.

2. The computing apparatus of claim 1, the interconnect link circuitry to:
receive, at the interconnect link, second data to be transmitted via the interconnect bus;
determine whether a batch processing flag is set;
compress the data and the second data based on a determination that the batch processing flag is set; and
transmit the compressed data and the second data to the requesting interconnect link via the interconnect bus.

3. The computing apparatus of claim 2, the interconnect link circuitry to combine the data and the second data based in part on a bitwise addition operation.

4. The computing apparatus of claim 1, the interconnect link circuitry to set a compression flag based on a determination that the bandwidth utilization of the interconnect bus is greater than or equal to the second threshold value.

5. The computing apparatus of claim 1, the interconnect link circuitry to:
determine, responsive to a determination that the bandwidth utilization of the interconnect bus is greater than or equal to the second threshold value, whether to batch process data transmission;
set a batch process flag based on a determination to batch process data transmission; and
wait for additional data to transmit via the interconnect bus.

6. The computing apparatus of claim 1, wherein the first threshold value is one of 50%, 55%, 60%, 65%, 70%, or a value between 50% and 70%.

7. The computing apparatus of claim 1, wherein the second threshold value is one of 60%, 65%, 70%, 75%, 80%, 85%, or a value between 60% and 85%.

8. A system, comprising:
a first processing unit;
an interconnect bus; and
a second processing unit coupled to the first processing unit via the interconnect bus,
wherein the first processing unit comprises;
at least one processing core; and
interconnect link circuitry to couple to the interconnect bus, the interconnect link circuitry to:
receive data to be transmitted to the second processing unit via the interconnect bus;
determine whether a bandwidth utilization of the interconnect bus is greater than or equal to a first threshold value;
determine whether a bandwidth utilization of the interconnect bus is greater than or equal to a second threshold value, the second threshold value greater than the first threshold value; and
transmit the data to a requesting interconnect link of the second processing unit via the interconnect bus based on a determination that the bandwidth utilization of the interconnect bus is not greater than or equal to the first threshold value;
transmit, after a delay, the data to the requesting interconnect link of the second processing unit via the interconnect bus based on a determination that the bandwidth utilization of the interconnect bus is greater than or equal to the first threshold value and a determination that the bandwidth utilization of the interconnect bus is not greater than or equal to the second threshold value; or
compress the data and transmit the compressed data to the requesting interconnect link of the second processing unit via the interconnect bus based on a determination that the bandwidth utilization of the interconnect bus is greater than or equal to the second threshold value.

9. The system of claim 8, the interconnect link circuitry to:
receive, at the interconnect link circuitry, second data to be transmitted via the interconnect bus;
determine whether a batch processing flag is set;
compress the data and the second data based on a determination that the batch processing flag is set; and
transmit the compressed data and the second data to the requesting interconnect link of the second processing unit via the interconnect bus.

10. The system of claim 9, the interconnect link circuitry to combine the data and the second data based in part on a bitwise addition operation.

11. The system of claim 8, the interconnect link circuitry to set a compression flag based on a determination that the bandwidth utilization of the interconnect bus is greater than or equal to the second threshold value.

12. The system of claim 8, the interconnect link circuitry to:
determine, responsive to a determination that the bandwidth utilization of the interconnect bus is greater than or equal to the second threshold value, whether to batch process data transmission; set a batch process flag based on a determination to batch process data transmission; and wait for additional data to transmit via the interconnect bus.

13. The system of claim 8, wherein the first threshold value is one of 50%, 55%, 60%, 65%, 70%, or a value between 50% and 70%.

14. The system of claim 8, wherein the second threshold value is one of 60%, 65%, 70%, 75%, 80%, 85%, or a value between 60% and 85%.

15. A computer-implemented method, comprising:
receiving, at an interconnect link, data to be transmitted via an interconnect bus coupled to the interconnect link;
determining whether a bandwidth utilization of the interconnect bus is greater than or equal to a first threshold value;
determining whether a bandwidth utilization of the interconnect bus is greater than or equal to a second threshold value, the second threshold value greater than the first threshold value; and
transmitting the data to a requesting interconnect link via the interconnect bus based on determination that the bandwidth utilization of the interconnect bus is not greater than or equal to the first threshold value;
transmitting, after a delay, the data to a requesting interconnect link via the interconnect bus based on determination that the bandwidth utilization of the interconnect bus is greater than or equal to the first threshold value and a determination that the bandwidth utilization of the interconnect bus is not greater than or equal to the second threshold value; or
compressing the data and transmitting the compressed data to a requesting interconnect link via the interconnect bus based on determination that the bandwidth utilization of the interconnect bus is greater than or equal to the second threshold value.

16. The computer-implemented method of claim 15, comprising:
receiving, at the interconnect link, second data to be transmitted via the interconnect bus;
determining whether a batch processing flag is set;
compressing the data and the second data based on a determination that the batch processing flag is set; and
transmitting the compressed data and the second data to the requesting interconnect link via the interconnect bus.

17. The computer-implemented method of claim 16, comprising combining the data and the second data based in part on a bitwise addition operation.

18. The computer-implemented method of claim 15, comprising setting a compression flag based on a determination that the bandwidth utilization of the interconnect bus is greater than or equal to the second threshold value.

19. The computer-implemented method of claim 15, comprising:
determining, responsive to a determination that the bandwidth utilization of the interconnect bus is greater than or equal to the second threshold value, whether to batch process data transmission;
set a batch processing flag based on a determination to batch process data transmission; and
wait for additional data to transmit via the interconnect bus.

20. The computer-implemented method of claim 15, wherein the first threshold value is one of 50%, 55%, 60%, 65%, 70%, or a value between 50% and 70%.

21. The computer-implemented method of claim 15, wherein the second threshold value is one of 60%, 65%, 70%, 75%, 80%, 85%, or a value between 60% and 85%.

22. The computer-implemented method of claim 15, the interconnect link circuitry of a processing unit comprising a plurality of processing cores.

\* \* \* \* \*